US008258704B2

(12) United States Patent
Brant

(10) Patent No.: US 8,258,704 B2
(45) Date of Patent: Sep. 4, 2012

(54) VEHICLE LIGHTING DISPLAY SYSTEM

(76) Inventor: Gregory S. Brant, Lake Tapps, WA (US)

(*) Notice: Subject to any disclaimer, the term of this patent is extended or adjusted under 35 U.S.C. 154(b) by 436 days.

(21) Appl. No.: 12/648,115

(22) Filed: Dec. 28, 2009

(65) Prior Publication Data

US 2011/0156588 A1 Jun. 30, 2011

(51) Int. Cl.
*B60Q 1/14* (2006.01)

(52) U.S. Cl. ........................... 315/77; 315/160; 315/308

(58) Field of Classification Search .................... 315/77, 315/82, 88, 90, 89, 93, 127, 128, 131, 136, 315/160, 161, 172, 185 R, 186, 192, 193, 315/209 R, 210, 217, 226, 291, 295, 297, 315/299, 306, 308, 307, 312, 313, 320, 362
See application file for complete search history.

(56) References Cited

U.S. PATENT DOCUMENTS

| | | | |
|---|---|---|---|
| 4,556,932 | A | 12/1985 | Lehrer et al. |
| 4,808,968 | A | 2/1989 | Caine |
| 4,874,228 | A | 10/1989 | Aho et al. |
| 4,965,950 | A | 10/1990 | Yamada |
| 5,707,130 | A | 1/1998 | Zwick et al. |
| 5,966,073 | A | 10/1999 | Walton |
| 5,975,728 | A | 11/1999 | Weyer |
| 6,915,758 | B2 | 7/2005 | Nakagawa et al. |
| 7,252,400 | B2 | 8/2007 | Clugston et al. |
| 2005/0093715 | A1 * | 5/2005 | Pederson ................ 340/815.45 |

* cited by examiner

*Primary Examiner* — Douglas W Owens
*Assistant Examiner* — Jianzi Chen
(74) *Attorney, Agent, or Firm* — Seed IP Law Group PLLC

(57) ABSTRACT

A lighting system for vehicles includes a housing having a front panel and a back panel, a reflector positioned adjacent the back panel, a plurality of light sources positioned on sides of the housing transverse to the back panel, a lens positioned the plurality of light sources and the front panel, a faceplate having a transparent pattern is configured to couple to the housing adjacent the front panel, a controller coupled to the light sources having a first input configured to couple to a vehicle ignition switch and a second input configured to couple to an accessory switch, and a color mapping interface coupled to the controller and configured to receive at least one removable color chip. The controller detects at least one color signal from the at least one removable color chip and controls the plurality of light sources in response to the at least one detected color signal.

16 Claims, 8 Drawing Sheets

VEHICLE LIGHTING DISPLAY SYSTEM

BACKGROUND

1. Technical Field

The present disclosure relates to accessory lighting for vehicles and, more particularly, to a system for illuminating a user-selected pattern on a vehicle light display that automatically switches from a user-selected color or colors to a government approved color scheme when the vehicle's engine is turned on.

2. Description of the Related Art

The durability, brightness, small size, and low current draw make light-emitting diodes (LEDs) useful for motor vehicle applications beyond the required exterior motor vehicle lighting. However, governmental regulators such as the U.S. Department of Transportation (D.O.T.) limit the colors of exterior vehicle lights that may be illuminated when the vehicle is operated on the highways in order to enhance highway safety. The D.O.T. generally prohibits the use of colors other than red, amber, or white while a vehicle is operated on a road so operators of other vehicles (such as automobiles, motorcycles, tractor-trailer combinations, motor homes, etc.) do not mistake the vehicle for an emergency vehicle. In addition, the D.O.T. regulates the colors of lights on vehicles to ensure consistency of light colors on vehicles so that operators can determine the orientation of a vehicle by the color of light the operator is viewing. Vehicle lighting colors are limited by the D.O.T. based on the location of the lights on the vehicle and a direction the lights are facing. The colors are generally restricted to red for the rear of the vehicle, amber for the sides of the vehicle, and white for the front of the vehicle.

Many operators choose to display a design or pattern of lights on their vehicle for decorative purposes, for advertising, or for increased safety. For example, a motorcyclist may want to increase their visibility to other operators by attaching additional lighting to the front, back, or sides of the motorcycle. Alternatively, an operator may desire to have accessory lighting on their vehicle for show, such as a pattern that represents the logo and colors of their favorite sports team. However, as mentioned above, the D.O.T. limits the colors of lights that may be used while a vehicle is in operation on public roadways. The decorative value, color variation, and level of customization are limited by the D.O.T. color restrictions.

Currently, some lighting fixtures for vehicles utilize LEDs arranged in housings and configured to emit fixed line-of-sight designs or patterns of light. Often the LEDs are arranged in the shape of the desired pattern, which is viewable from a fixed line of sight. These fixed colors and fixed shape arrangements also have limited customization because of the above-described D.O.T. color restrictions.

FIG. 1 is an exemplary pattern 10 of LEDs 12 fixed into a Maltese cross. The LEDs 12 are arranged in the pattern 10 on a base 14. In order to change the pattern 10 or the colors of the LEDs 12, the operator must change the entire light assembly by detaching the base 14 from the vehicle.

Operators have also used LEDs for indirect lighting on motor vehicles, often called "street glow." The LEDs used for indirect lighting do not display a pattern of light, but instead are directed toward the ground or other parts of the vehicle in order to provide a glowing effect. The fixed LEDs of FIG. 1 and the street glow lighting is available in single color LEDs and in LEDs capable of producing multiple, selectable colors.

The use of single color LEDs limits the degree to which the operator can customize and later change the color of emitted light. Single color LEDs are simple to use as they do not require the operator to set the color of the light. However, if the operator wishes to change the color of single color LED lights, they must physically replace each LED with a new LED of the desired color. Single color LEDs can display only one color, so the operator is not able to have the lights cycle between two selected colors. Single color LEDs are generally only available in several hues of each of the colors from the group of primary and secondary colors including red, green, blue, white, purple, amber, orange, sky blue, teal, and pink. It is generally not feasible for manufacturers or suppliers to make and stock many subtle variations of hues, such as reddish purple or bluish purple.

FIG. 2 illustrates how each individual LED produces a small, intense area of light in a conical pattern when projected towards a lens 18 that forms a backlit surface. When viewed in direct line of sight, such as the pattern 10 in FIG. 1, the array of LEDs 12 form a non-uniform light source because each LED 12 is discernable. More particularly, each LED 12 produces a visual optical "hotspot" in the light pattern. The severity of the hotspot is intensified by the distance between a back 16 of the base 14 and the lens 18. The smaller the distance between the back 16 and the lens 18, the more intense the hotspot, and a less uniform pattern of light will be due to gaps between the cones of light.

The ability to discern the details of a shape or pattern of light is directly related to the uniformity across the viewable area of the illumination used to create the emitted pattern. Greater pattern detail can be discerned if the light emitted is more uniform. Thus, while a line-of-sight, fixed-LED approach may maximize brightness, the patterns of lights emitted are limited to rudimentary designs and patterns.

FIG. 3 illustrates a larger distance between the back 16 of the base 14 and the lens 18. The greater distance allows the light emitted from the LEDs 12 to be more uniform and therefore create the illuminated pattern with fewer hotspots. By allowing sufficient distance between the LEDs 12 and the lens 18, i.e., the backlit surface, the light is allowed to diffuse through the lens 18. The beams of light overlap before striking the diffusing lens 18 and create a more uniform illumination. However, the distance between the back 16 and the lens 18 must be minimized for motor vehicle applications.

In order to use LEDs capable of emitting multiple, selectable colors, a color changing control device is used to control an amount of electrical flow to each of a respective red, green, and blue emitter. The various colors are created by mixing combinations of red, green, and blue. The current motor vehicle LED color control devices can cycle between multiple colors, but the patterns of colors and the colors emitted are preset by the manufacturer. The operator cannot select the colors they want and often results in undesired colors being displayed. Thus, the operator is not able to customize the colors in the cycle to match vehicle paint colors, company colors, product advertising colors, favorite sports teams, or to celebrate a holiday.

Prior motor vehicle light control devices could only be configured to emit light in a fashion so as to emulate single color LEDs. To set multicolor LEDs to a given color, the lights must be manually stopped on the desired color as they are cycling through the range of colors the LEDs can produce. Alternatively, the operator sets the light emitted by the light sources separately through a non-indexed interface to achieve a desired color or color mix. This process is repeated each time the operator desires to change colors.

Equipping a fleet of vehicles with an illuminated design of a company logo is difficult because each vehicle should have the same color or mix of color light emitted. The company may want to change the color if delivering a certain product in order to advertise the product, or the company may desire to change the colors for a holiday. With current control schemes it is difficult to achieve consistency in the control of the color across their fleet of vehicles.

In addition, it is time-consuming to set the amount of light emitted by the multicolor light sources of each vehicle in the fleet to achieve the desired hue not only initially, but whenever a new color is to be displayed. It is also difficult to get a color consistently repeated across each vehicle in the fleet, as manually setting the color mix visually is subject to variations in the settings when the process is repeated numerous times. This problem is compounded when the vehicles are geographically separated so that using one as a visual reference for another is not possible.

BRIEF SUMMARY

The present disclosure is directed to a lighting system for vehicles that is sufficiently thin for mounting on a vehicle while uniformly illuminating an entire viewable area of a user-selected pattern. The lighting system provides a variety of color options for the user that automatically switch to D.O.T. specified colors when the vehicle is turned on. The user can choose to have the lighting system illuminated and displaying a variety of colors while the vehicle is parked. In addition, the user can have the lighting system illuminated while driving the vehicle, displaying only D.O.T. specified colors.

In accordance with the present disclosure, a lighting system for vehicles is provided that includes a housing having a front panel and a back panel, the front panel having an opening; a reflector in the housing positioned adjacent the back panel; a plurality of light sources in the housing positioned on sides of the housing that are transverse to the back panel; a lens positioned in the housing between the plurality of light sources and the front panel; a plurality of fasteners configured to couple the lens to the housing; a faceplate configured to couple to the housing adjacent the front panel, the faceplate having a transparent pattern; a controller coupled to the light sources having a first input configured to couple to a vehicle ignition switch and a second input configured to couple to an accessory switch; and a color mapping interface coupled to the controller and configured to receive at least one removable color chip, the controller configured to detect at least one color signal from the at least one removable color chip and to control the plurality of light sources in response to the at least one detected color signal.

In accordance with another aspect of the present disclosure, the controller includes an embedded microcontroller configured to cycle the plurality of light sources between colors that correspond to detected color signals from the at least one removable color chip. The reflector has a first end and a second end that are adjacent the back panel and a peak along a central axis of the reflector that is spaced from the back panel by a first distance.

In accordance with another aspect of the present disclosure, the lighting system includes a mounting system having a malleable member positioned between edges formed on the sides of the housing and ends of the lens; the plurality of fasters configured to bring the lens into contact with the malleable member to form a cavity that encloses the light sources and the reflector; and a light source mount positioned adjacent the fastener and configured to position the plurality of light sources at a second distance from the back panel, wherein the second distance is greater than the first distance. The light sources are mounted to the sides of the housing between the malleable member and the back panel. In addition, the light sources are light emitting diodes that are configured to emit a plurality of colors.

In accordance with a further aspect of the present disclosure, the reflector has a shallow inverted V shape, a peak of the V extending along a central axis of a length of the housing and a slope of sides of the V increasing in steepness as the sides approach the peak. The faceplate has an opaque region and the transparent pattern, wherein the opaque region covers a portion of the housing where the light sources are mounted. The transparent pattern is configured to be uniformly backlit by the plurality of light sources.

In accordance with another embodiment of the present disclosure, an apparatus is provided that includes a vehicle and a lighting system coupled to the vehicle. The lighting system includes a housing coupled to the vehicle, the housing having a front panel and a back panel, the front panel having an opening; a reflector in the housing positioned adjacent the back panel; a plurality of light sources in the housing positioned on sides of the housing that are transverse to the back panel; a lens positioned in the housing between the plurality of light sources and the front panel; a plurality of fasteners configured to couple the lens to the housing; a faceplate configured to couple to the housing adjacent the front panel, the faceplate having a pattern; a controller coupled to the light sources having a first input coupled to a vehicle ignition switch and a second input coupled to an accessory switch; and a color mapping interface coupled to the controller and configured to receive at least one removable color chip, the controller configured to detect at least one color signal from the at least one removable color chip and to control the plurality of light sources in response to the at least one detected color signal.

Ideally, the controller includes an embedded microcontroller configured to cycle the plurality of light sources between colors that correspond to detected color signals from the at least one removable color chip. The reflector has a first end and a second end that are adjacent the back panel and a peak along a central axis of the reflector that is spaced from the back panel by a first distance.

In accordance with another aspect of the present disclosure, the apparatus includes a mounting system having a malleable member positioned between edges formed on the sides of the housing and ends of the lens; the plurality of fasters configured to bring the lens into contact with the malleable member to form a cavity that encloses the plurality of light sources and the reflector; and a light source mount positioned adjacent the plurality of fasteners and configured to position the plurality of light sources at a second distance from the back panel, wherein the second distance is greater than the first distance. The light sources are preferably light emitting diodes that are configured to emit a plurality of colors.

In accordance with yet another embodiment of the present disclosure, a lighting system for a vehicle is provided that includes a housing having a back panel, a front panel that has an opening, and first and second side panels that are transverse to the front and back panels; a light guide positioned in the housing having a first section and a second section that cooperate to form a central ridge that is spaced from the back panel by a first distance, the first and second sections having a curvature from the central ridge towards an intersection of the back panel and first and second side panels, respectively; a plurality of light sources mounted to the first and the second side panels and positioned transverse to the back panel; a lens coupled to the housing between the light sources and the front panel; a faceplate coupled to the front panel of the housing, the faceplate having an opaque section and a transparent section having a shape; and a mounting system.

In accordance with another aspect of the present disclosure, the mounting system includes a malleable member positioned between edges formed on the first and second side panels and ends of the lens; a plurality of fasteners that couple the lens to the housing and are configured to bring the lens into contact with the malleable member to form a cavity that encloses the plurality light sources and the reflector; and a light source mount positioned adjacent the plurality of fasteners and configured to position the plurality of light sources at a second distance from the back panel, wherein the second distance is greater than the first distance of the central ridge.

In accordance with another aspect of the present disclosure, the lighting system further includes a controller coupled to the plurality light sources having a first input coupled to a vehicle ignition switch and a second input coupled to an accessory switch; a color mapping interface coupled to the controller and configured to receive at least one removable color chip, the controller configured to detect at least one color signal from the at least one removable color chip and to control the plurality of light sources in response to the at least one detected color signal; and an embedded microcontroller configured to cycle the plurality of light sources between colors that correspond to detected color signals from the at least one removable color chip.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with vehicles have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Throughout this disclosure the term "vehicles" is intended to encompass ground based, lighter than air, and amphibious.

The present disclosure is directed to a thin accessory lighting system for a vehicle that is capable of emitting a user-selectable pattern of light in a user-selected color that is highly discernable by a viewer. The pattern of light may be for decorative, advertising, or promotional purposes. For example, the pattern may be a simple shape, a logo, a name, a website, a product name, a phone number, or any other symbol or phrase that the user selects.

In a preferred embodiment, the lighting system automatically switches from the user-selected color to a color that is in accord with the regulations of the Department of Transportation (D.O.T.) when the ignition of the vehicle is turned "on." The D.O.T. specified colors include red for the rear of the vehicle, amber for the side of the vehicle, and white for the front of the vehicle. When the vehicle is in operation, the lighting system is configured to emit the specific colors referenced in association with the particular location on the vehicle as determined by the D.O.T. The automatic color transition allows the pattern of the lighting system to be illuminated while the vehicle is safely and legally operated on streets and highways.

Figure 4:
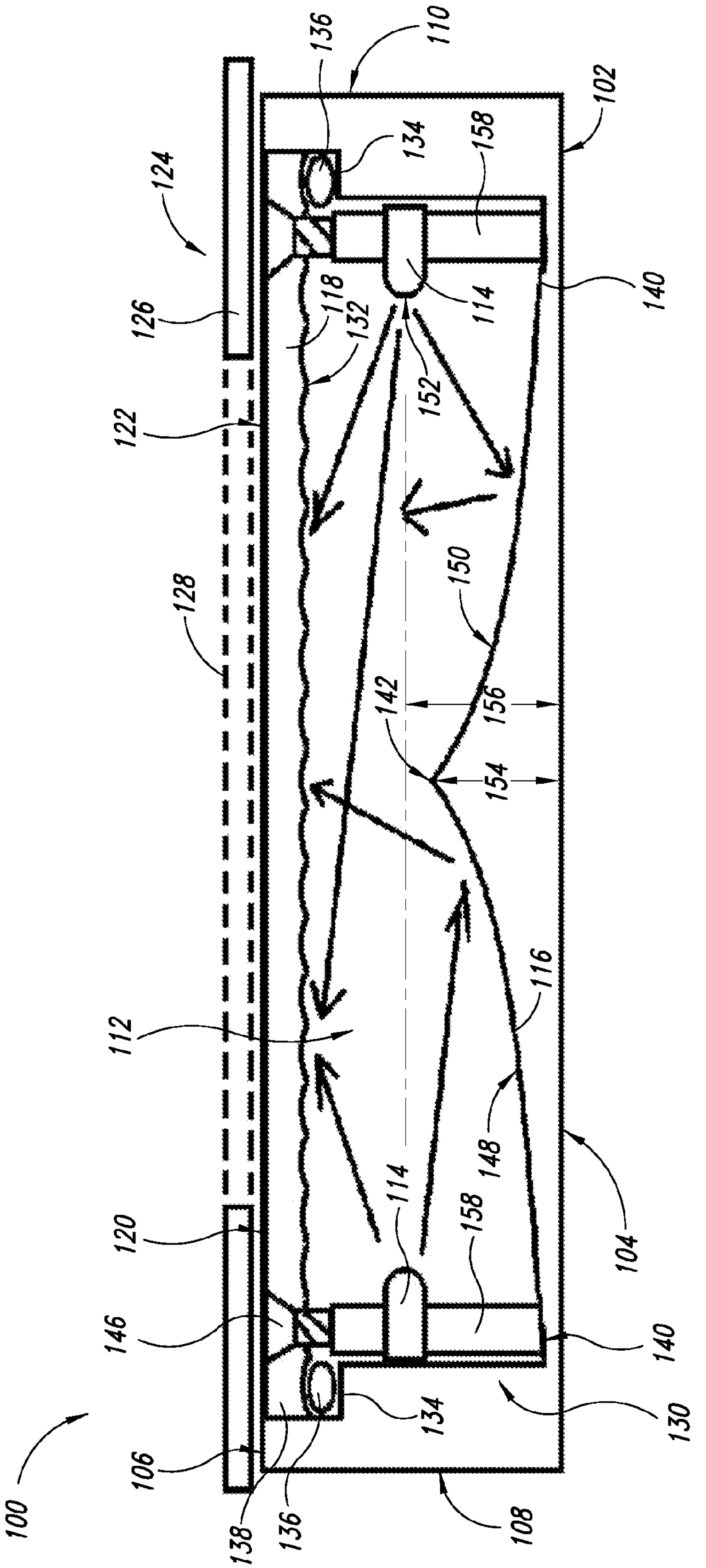
FIG. 4 illustrates a cross-sectional view of a lighting system for vehicles according to an embodiment of the present disclosure.

Referring to FIG. 4, a lighting system 100 for a vehicle includes a housing 102 having exterior surfaces that form a cavity 112 containing a plurality of LEDs 114, a reflector 116, a lens 118, and a mounting system 130. The exterior surfaces include a back panel 104, a front panel 106, and two opposing side panels 108 and 110 that are transverse to the front and back panels 106, 104 of the housing 102. The front panel 106 has an opening 120 that exposes an exterior surface 122 of the lens 118. Additional side panels are described and illustrated in FIGS. 12 and 13.

The lighting system 100 includes an interchangeable faceplate 124 positioned adjacent the front panel 106 and having an opaque region 126 and a transparent region 128. The faceplate 124 is sized and shaped to cover the entire front panel 106 of the housing 102. Ideally, the opaque region 126 hides the LEDs 114 and the mounting system 130 from view by an observer of the lighting system when mounted on a vehicle. In addition, the transparent region 128 is shaped in a pattern that is uniformly illuminated and backlit by the LEDs 114.

The faceplate 124 may be affixed to the housing 102 directly with removable fasteners 146 passed through mounting holes in the front panel 106 or lens 118. The faceplate 124 may have a substantially planar configuration, with or without side mounting tabs, formed of sheet metal or opaque plastic. In this embodiment, outer dimensions of faceplate 124 are sized to be larger than the housing 102. Alternatively, the faceplate 124 may be connected to the housing 102 by side mounting tabs formed on the faceplate or with adhesive, glue, magnets, or other suitable attaching device. In one embodiment, the faceplate 124 is larger than the housing 102 with ends that are bent towards the housing. The bent ends may have openings configured to receive fasteners that couple the bent ends of the faceplate to an exterior of the side panels.

The orientation of the LEDs 114 allow the housing 102 to be thin while also uniformly distributing the light through the lens 118. The positioning of the LEDs 114 allows the housing 102 to have a greater length instead of thickness, thereby providing sufficient distance to allow the light to uniformly diffuse through the lens 118.

Figure 13:
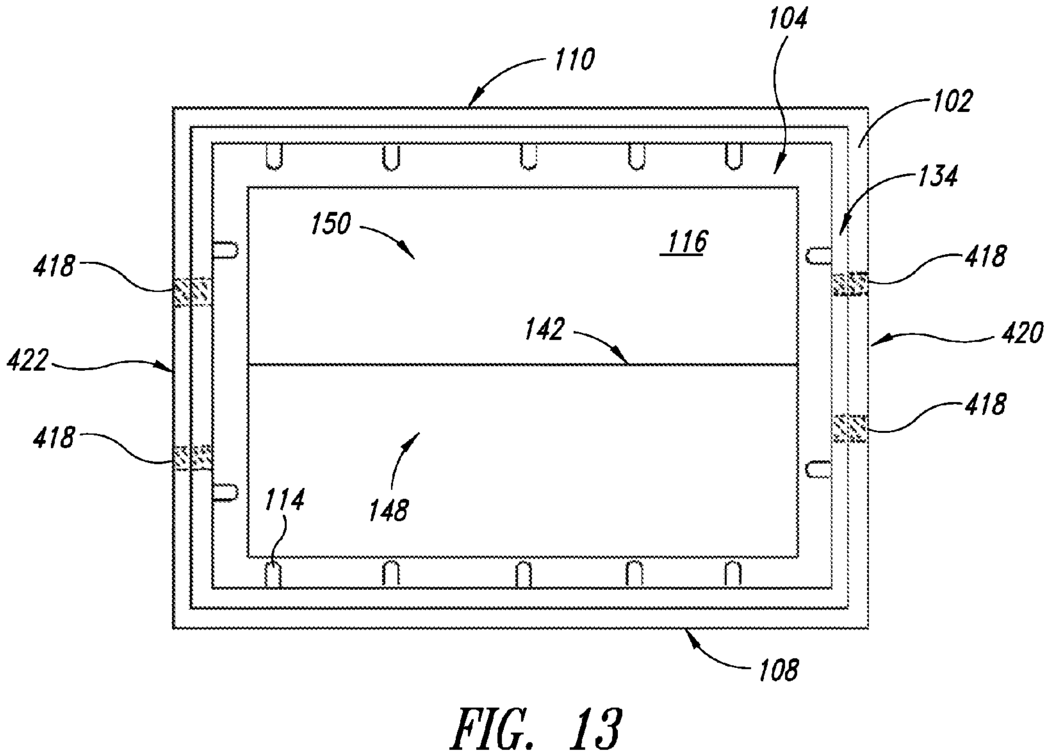
FIG. 13 is a front view of a housing of an embodiment of the lighting system without the faceplate.

The side panels 108, 110 of the housing 102 have edges 134 that cooperate with malleable members 136 and ends 138 of the lens 118 to seal the cavity 112 of the housing 102. The LEDs 114 are mounted on the side panels 108, 110 of the housing 102 between the malleable members 136 and the back panel 104. In one embodiment, the LEDs 114 are substantially parallel in orientation with respect to the back panel 104. However, the LEDs 114 may be angled to maximize the diffusion of emitted light. In addition, the edges 134 may be formed around the entire perimeter of the housing 102 on each of the side panels as illustrated in FIG. 13.

The front, back, and side panels 106, 104, 108, and 110, respectively, may be formed from an opaque injected or extruded automotive-grade plastic. Alternatively, the front and back panels 106, 104 of the housing 102 may be formed from an extruded automotive-grade plastic cross-section of the housing 102 that is cut to a desired length and closed with end caps that form two of the four the side panels. In addition, the housing 102 may also be formed from a stamped or a formed sheet metal.

Figure 2:
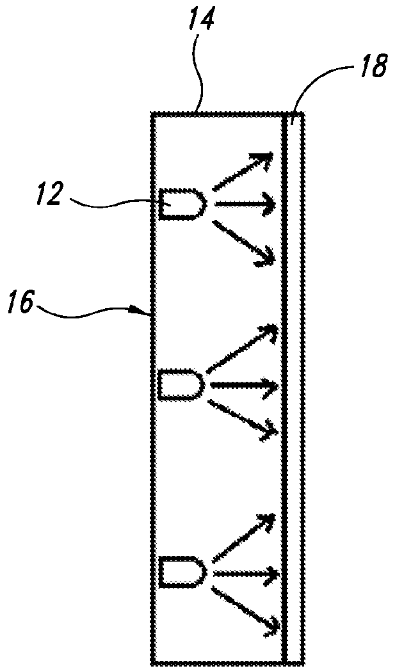
FIG. 2 (Prior Art)
FIG. 2 is a cross-sectional view of a known design of a plurality of LEDs in a housing having a lens in a position that creates visual hotspots due to insufficient distance between the LEDs and the lens.
Figure 3:
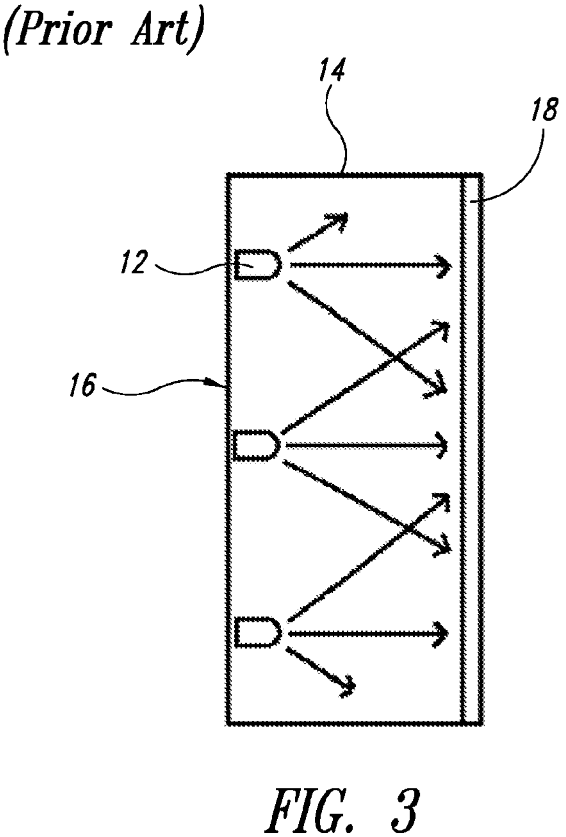
FIG. 3 (Prior Art)
FIG. 3 is a cross-sectional view of a known design of a plurality of LEDs in a housing having a lens positioned to reduce visual hotspots.

The size of the housing 102 is preferably thin in order to enable mounting to a variety of vehicles in a variety of locations. However, as described above with respect to FIG. 2, if the LEDs are too close to the lens, hotspots of light are formed that detract from the visibility of the pattern. Accordingly, the effective distance between the LEDs 114 and the lens 118 is increased by positioning the LEDs transverse to the side panels. A center of the LEDs 114 directed to the reflector 116 to increase the path light travels prior to passing through the diffusing lens 118. The challenge is to do so while still providing for a majority of the cavity 112 of the housing 102 to be backlit in order to maximize the usable area for displaying the pattern of emitted light.

The LEDs 114 are oriented to emit light towards the reflector 116 that is positioned adjacent the back panel 104. The reflector 116 is sized and shaped to direct light from the LEDs 114 through the opening 120 in the housing 102 and the lens 118. The reflector 116 has ends 140 that are coupled to the back panel 140. From these ends 140, the reflector 116 curves up to a peak 142 that is aligned with a central axis of the housing. In one embodiment, the peak 142 marks the center of the housing 102 positioned half way between the LEDs 114 mounted on the side panels 108, 110, respectively. Alternatively, the reflector 116 may be described as a shallow inverted V opening toward the back panel 104 and having a peak 142 extending along the longer dimension of the housing 102. A slope of sides of the V becomes steeper as the sides approach the peak or central ridge of the reflector.

The reflector may be a single panel having a first surface 148 and a second surface 150 that each have ends 140. The first and second surfaces 148, 150 may be a single component that is manipulated to form the peak 142 or the first and second surfaces 148, 150 may be on two different panels positioned to form the peak 142. The first and second surfaces 148, 150 may be configured to be mirror images of each other, having a concave shape. Ideally, a focus point of the first and second surfaces 148, 150 are pointing away from each other and positioned higher than the peak 142 of the reflector 116.

The reflector 116 is configured to uniformly illuminate the pattern of the transparent region 128 by backlighting the entire viewable area. The reflector 116 distributes the light emitted more evenly to create visually uniform edges of the pattern illuminated, thereby greatly increasing the ability to discern the pattern.

The reflector 116 may be formed as part of the housing 102, e.g., molded into the housing when the housing is formed. After the housing is molded, a reflective or other light guiding material, such as foil or a metal sheet, may be attached to the inverted V shaped mold to form the reflector 116. Alternatively, the reflector 116 may be a separate reflective component that is attached to the housing 102 with fasteners or adhesive.

The lighting system also includes a color switching device 200 that is coupled to the ignition switch 202 of the vehicle to ensure automatic switching from the user-selected color to the D.O.T. specified colors when the vehicle is turned on. The color switching device 200 includes a color mapping interface 214 that is configured to receive color signals from removable color chips 216. The removable color chips 216 allow the user to easily change the colors displayed by the lighting system 100 without replacing the LEDs 114. The color switching device 200, the color mapping interface 214, and the removable color chips 216 will be described in more detail below with respect to FIGS. 5 and 6.

In one embodiment, the housing 102 is rectangular in shape and the side panels 108, 110 extend along a length of the rectangle. The reflector 116 is positioned in relation to a width of the rectangle where the peak 142 extends substantially parallel to the side panels 108, 110.

The mounting system 130 is configured to prevent moisture from getting into the housing and affecting the electrical components or the light reflective properties of the reflector 116. The mounting system 130 includes the fasteners 146, the malleable member 136, the lens 118, and a mount of the LEDs 114. The lens 118 is sized and shaped to seal the opening of the front of the housing 102 by using the fasteners 146 to press the lens 118 against the malleable member 136. The ends 138 of the lens are formed to ensure a water-tight seal with the malleable member 136. In one embodiment, the interior surface 132 of the ends 138 are flat and are not scalloped like the interior surface 132 in the center of the cavity.

The malleable members 136 sit on the edges 134 of the side panels 108, 110 that are formed as shelves or steps. The malleable members 136 are a sealing mechanism that may be a rubber or neoprene o-ring or a water resistant gasket material.

The lens 118 may be formed of a clear plastic light-diffusing material with an interior surface 132 having a female conical prismatic side facing the back side 104 of the housing 102. The interior surface may be referred to as a light incident side of the diffusing lens 118. The exterior surface 112 of the lens 118 is smooth and faces the front side 106 of the housing 102. Other embodiments of the diffusing lens may include other clear prismatic patterns or a translucent white lens having a concentration of stipples on the interior surface with a smooth surface facing outward.

The type of material selected for the diffusing lens depends on the effect desired by the motorist. A clear prismatic material provides more sparkle and truer color rendering. A translucent white lens provides a higher contrast to the opaque region 126 during daylight hours. The higher contrast allows better discernability of the pattern or design during the day.

A portion of the light from a single LED strikes the surface of the reflector 116 toward which it is oriented, either the first surface 148 or the second surface 150. The first or second surface 148, 150 then reflects the light to the diffusing lens. Ideally, the position of the peak 142 of the reflector 116 is such that light is able to strike it directly so that no shadow is created. Since the light emitted from each LED is a cone shape, the light strikes the reflector 116 and the diffusing lens 118 from multiple directions. The reflector 116 directs and reflects the light to strike the diffusing lens 118 from numerous directions where the light is further diffused by the stipples or prisms of the lens 118. This arrangement balances the amount of light reflected with direct light striking the diffusing lens 118, while illuminating the peak 142 of the reflector 116 and preventing a peak 142 shadow.

Guiding a majority of the light emitted by the LEDs 114 through the light-conducting diffusing lens 118 through direct incident with the prisms or stipples or by reflecting the light off the reflector 116 achieves high light utilization efficiency. This can provide illumination with a high uniform luminance and a significant reduction in visual hotspots. Therefore the visible area of the diffusing lens 118 can be uniformly illuminated over its entire surface, providing the pattern or design a high degree of discernability by the viewer at a greater distance than by using line of sight LED backlighting.

The faceplate 124 functions as a partially opaque mask for the light transmitted from the housing 102. The pattern or design to be displayed is created by allowing light emitted by the viewable area of the diffusing lens 118 to pass through the transparent region 128. The transparent region 128 may be an opening, it may be a material having a plurality of openings that allow light to pass through, or it may be a sheet of material that allows light to pass through. The transparent region 128 is the shape of the desired pattern or design to be displayed. The faceplate 124 is positioned over housing 102 to cover the entire front panel 106 of the housing 102, so that the design or pattern of the transparent region 128 aligns with the diffusing lens 118.

The LEDs 114 emit light directionally in the shape of an outward facing cone that is perpendicular to a top center 152 of the LED 114. A view angle relates to how far from the center 152 of the cone of light a viewer can distinguish an acceptable brightness or amount of emitted light. As illustrated in FIG. 4, the LEDs 114 are positioned with the center 152 of the LED view angle directed toward the peak 142 of the reflector 116, and parallel to the diffusing lens 118 and faceplate 124. The center 152 of the LEDs 114 are positioned to be slightly shifted from a mid-point of the housing 102 between the back panel 104 and the interior surface 132 of the lens 118. The LEDs 114 are positioned closer to the lens 118.

Ideally, the LEDs 114 are positioned so that the centers 152 of the LEDs 114 are spaced from the peak 142 of the reflector 116. More particularly, the peak 142 of the reflector 116 is spaced from the back panel 104 by a first distance 154 and the centers 152 of the LEDs 114 are spaced from the back panel by a second distance 156. The first distance 154 is shorter than the second distance 156. Accordingly, the LEDs 114 are slightly shifted from the focus point of parabolic surfaces of the reflector 116 to minimize the thickness of the housing 102, and ensure the LEDs 114 remain obscured from view behind the opaque region 126 of the faceplate 124.

Figure 5:
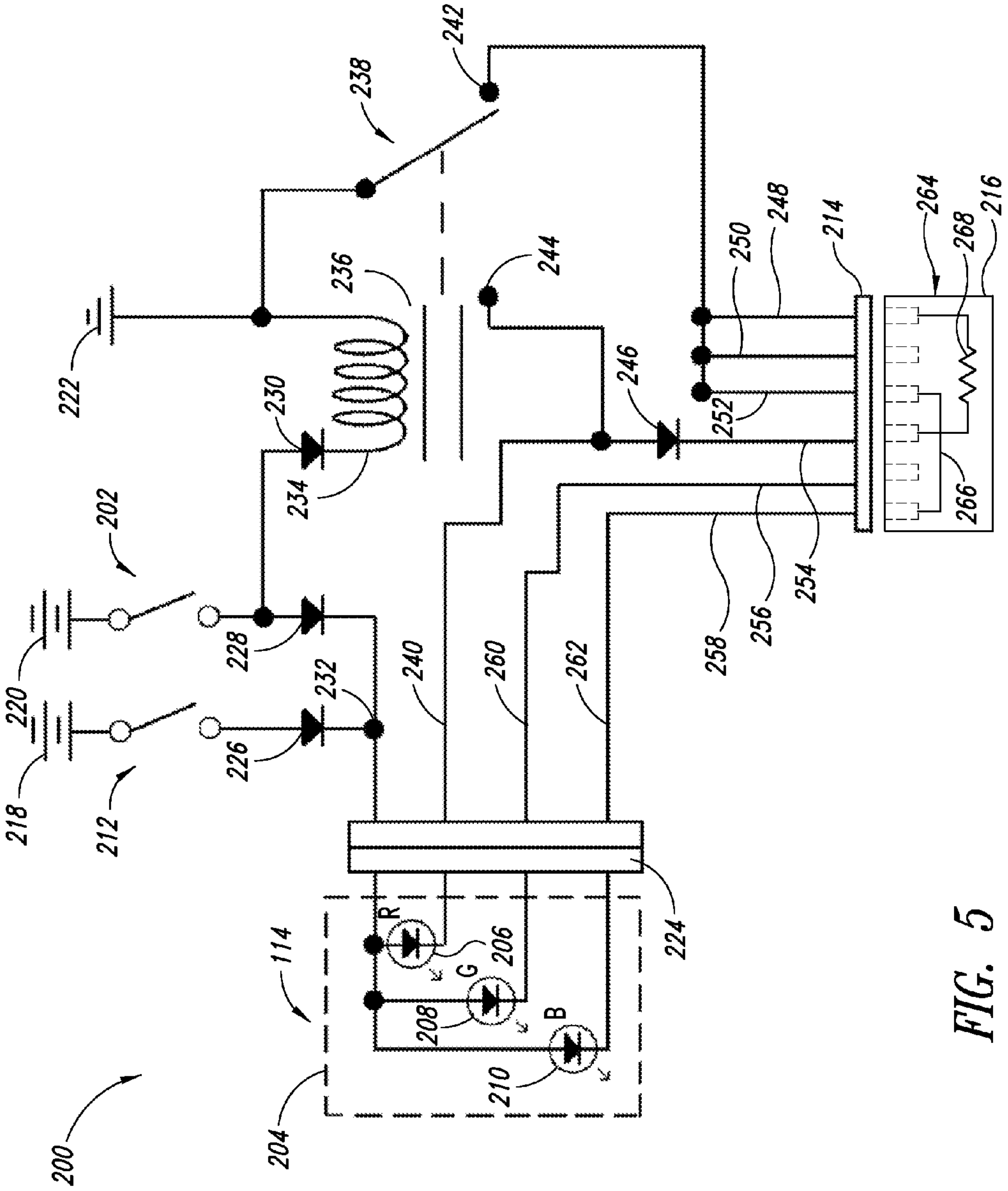
FIG. 5 is a circuit schematic of a color switching device of the lighting system of FIG. 4.

The LEDs 114 are of a type to be selectable to emit any perceived color of light that can be created by combining the colors red, green, and blue, in equal or unequal ratios. The industry term for this type of LED is an RGB LED. An example RGB LED 114 having a singular package 204 containing one individual red LED 206, one individual green LED 208, and one individual blue LED 210 is illustrated in FIG. 5. The package 204 is configured to possess a lead for each of the three colors, and to possess either one anode per each color and a common cathode, or possess one cathode per each color and a common anode.

The LEDs 114 are coupled to the housing 102 with a transportation-grade adhesive or held in place by alignment posts 158 that are integrally molded as part of the housing 102. The alignment posts 158 may be in positioned in corners of the housing 102. In addition, the alignment posts 158 may also include a forward facing threaded cavity that is configured to receive fasteners 146. Electrical connective wires couple the LEDs 114 to the color switching device 200, preferably positioned behind the opaque region 126 of the faceplate 124

FIG. 5 illustrates an embodiment of the color switching device 200 that is configured to control and activate the LEDs 114 in accordance with the state of the vehicle. More particularly, the color switching device 200 detects and automatically displays colors associated with the removable color chip 216 that is coupled to the color mapping interface. If an accessory switch 212 is turned on, the color switching device 200 activates the LEDs 114 and displays the colors of the removable color chip 216.

The color switching device 200 includes first and second power inputs 218, 220, respectively, and a ground wire 222. The first power input 218 is coupled to the accessory switch 212 and to the vehicle's battery or other power source. The second power input 220 is coupled to the ignition switch 202 of the vehicle.

The lighting system 100 may be activated while the vehicle is parked and not turned on. For example, the first power input 218 may be activated when the ignition switch 202 is open, i.e., the vehicle is turned off. Alternatively, the second power input 220 is activated immediately upon turning the vehicle on, which triggers the ignition switch 202 to close. When the second power input 220 is activated, the color switching device 200 only allows electrical current to flow through the LEDs 114 in a fixed ratio that produces the appropriate D.O.T. color of light associated with the placement of the lighting system 100 on the vehicle. For example, the color switching device 200 would activate only the red LED 206 if the lighting system 100 is affixed to a rear of the vehicle.

The color switching device 200 ensures the lighting system 100 is emitting light in accordance with the D.O.T. specified colors when the vehicle is operating, even if the accessory circuit switch is not turned on. The lighting system may be configured to function as an auxiliary vehicle light to provide additional vehicle visibility to other motorists and enhance safety. This is especially important on vehicles such as motorcycles, which have the inherent problem of visibility to other drivers.

The LEDs 114 of the color switching device 200 are illustrated as sharing a common anode. However, the LEDs 114 may be positioned to share a common cathode. A single four-position connector 224 is shown, however, two or more connectors may be included to power multiple LEDs 114 or multiple lighting systems 100 on a single vehicle.

The first power input 218 is coupled to the accessory switch 212 and to a first diode 226 to prevent reverse current flow. The second power input 220 is coupled to the ignition switch 202 and to a second diode 228, also to prevent reverse current flow. A third diode 230 is coupled to the anode of the second diode 228 and the ignition switch 202. The cathode of the second diode 228 couples to the cathode of the first diode 226 and to an input 232 of the four-position connector 224. The input 232 corresponds to the common anode of the LEDs 114.

The housing 102 may be configured to have four LED lead wires that are configured to couple to the four-position connector 224 at a location on the vehicle away from the lighting system 100. For example, the color switching device 200 may be installed near or in the interior of the vehicle to allow the user easy access to the accessory switch and the color mapping modules 216.

The third diode 230 is configured to prevent reverse current flow and also couple the ignition switch 202 to a coil 234 of a relay 236. The coil 234 is coupled to ground 222 and a switch 238. The switch 238 may couple to a first connection 242 or to a second connection 244. The first connection couples to a first, second, and third input 248, 250, 252, respectively, of the six position color mapping interface 214. The second connection 244 couples to a fourth input 254 of the six position color mapping interface 214 through a fourth diode 246. The second connection 244 is also coupled to a second input 240 of the four position connector 224.

The second input 240 of the four-position locking connector 224 is the contact that corresponds to the red LED 206 of the RGB LEDs 114. A fifth input 256 of the six position color mapping interface 214 couples to a third input 260 of the four-position locking connector 224, which corresponds to the green LED 208. A sixth input 258 of the six position color mapping interface 214 couples to a fourth input 262 of the four-position locking connector 224, which corresponds to the blue LED 210.

The color switching device 200 may be formed on a printed circuit board that is affixed within a package having wires accommodating through-holes for the power inputs 218, 220 and the ground 222. The package of the color switching device 200 includes an interface or plurality of wires to connect to the four input wires for the four-position locking connector 224. A rubber or neoprene sealing grommet may be used to prevent rain water from entering into the color switching device 200 package if it is positioned on an exterior of the vehicle. The 6-position locking header 214 is positioned to be easily accessible to the user, either directly adjacent the package or positioned at a distance from the package. Any wires extending away from the package may be sealed with an epoxy potting material.

The removable color chip 216 may be enclosed in a small plastic case 264 possessing a 6-contact configuration so as to mate with and lock to the six-position color mapping interface 214 coupled to the color switching device 200. Each of the fourth, fifth, and sixth inputs 254, 256, and 258, respectively of the six-position color mapping interface 214, which are associated with the red, green, and blue LEDs 206, 208, and 210, respectively, are either connected to ground by a jumper 266, connected to an inline resistor 268, or unconnected to ground.

Alternatively, the color mapping interface 214 may be configured to have a common ground for each of the fourth, fifth, and sixth inputs 254, 256, and 258, respectively, thereby reducing the size of the color mapping interface 214.

The removable color chips 216 are manufactured to provide a particular color pattern and provides the user with an easy way to manipulate the colors displayed from the lighting system 100. The removable color chips 216 provide uniformity of color selection and avoid problems associated with user error.

The electrical flow is split into three paths, one for each color emitter in the multicolor LEDs 114. The three paths are routed through the removable color chip 216 to proportion the electrical flow to each path to cause the selected color to be emitted by the LEDs 114.

The lighting system 100 is normally in one of two operating states. The first state is when the accessory lighting switch 212 is closed and the vehicle ignition switch 202 is open. This state would normally occur when the vehicle is parked with the engine off. The lighting system 100 will therefore illuminate the pattern in accordance with the user-selected colors in the removable color chip 216.

Current flows from the vehicle through the accessory switch 212 in the color switching device 200. Current flows from the color switching device 200 to the common anode lead wire of the LEDs 114 via the first input 232 of the four-position connector 224. This provides electrical current to each of the red, green, and blue LEDs 206, 208, 210 in the package 204. Whether current flows through each of the red, green, and blue LEDs 206, 208, 210 is determined by the removable color chip 216 attached to the six-position color mapping interface 214.

The color mapping interface 214 also has three contacts that connect to the normally closed path through the first position 242 of the relay 236 and to ground 222. When the jumper 266 in the removable color chip 216 closes the circuit from one of the LEDs 114 to one of the contacts, i.e., the first, second, or third input 248, 250, 252 of color mapping interface 214, to the ground 222, current flows through that LED 114 and emits that LED's color of light.

In FIG. 5, the blue LED 210 is coupled to ground 222 by the jumper 266. The inline resistor 268 is used in series in the removable color chip 216 to close the circuit from the red LED 206 through the fourth input 254 of the color mapping interface 214 to the ground 222. Therefore, a reduced amount of current flows through the red LED 206 and less red light is emitted. If no jumper is present for a given color, as is illustrated with the green LED 208, no light of that color is emitted. When activated as illustrated in FIG. 5, the LEDs 114 would emit a perceived color of bluish-purple by concurrently emitting blue at full brightness and red at reduced brightness.

Colors in addition to red, green, and blue are produced by various combinations of red, green, and blue. Hues of colors are produced by reducing the flow of electricity to one or more of the individual LEDs through the use of a resistor placed in line between the power supply and the individual red, green, or blue LEDs 206, 208, 210.

The second state in which the color switching device 200 may operate is when the vehicle ignition switch 202 is closed. This state would normally occur when the vehicle's engine is on, and occurs regardless of the status of the accessory lighting switch 212. Electrical current is provided to the ignition switch from the vehicle power input 220.

When closed, the ignition switch 202 energizes the coil 234 of relay 236, thus swinging the switch 238 to the second position 244, which couples the second position to ground 222. The ignition switch 202 also couples to the common anode lead wire through the first input 232 of the four-position connector 224 to provide electrical current to each of the red, green, and blue LEDs 206, 208, 210 in the package 204. The current does not flow through the color mapping interface 214 or through the removable color chip 216 because the normally closed first position 238 is now open. Therefore, the removable color chip 216 has no ground with which to complete the circuit.

Since the switch 238 is in the second position 244, the red LED 206 is coupled to ground 222. The fourth diode 246 prevents the green and blue LEDs 208, 210 from having a closed circuit to ground 222. Therefore, in this embodiment, the LEDs 114 only emit red light when the vehicle ignition is on. The lighting system 100 would then be a rear mounted lighting system in accordance with colors specified by the D.O.T. for operating motor vehicles.

In this embodiment, the lighting device 100 would emit the bluish-purple hue when the vehicle was not in operation for decorative or advertising purposes and in D.O.T. approved red when the vehicle is turned on. The color switching device 200 would automatically change the color displayed when the ignition switch 202 is turned on. The lighting system 100 may supplement or function as a taillight.

When the vehicle ignition is turned off, the color switching device 200 automatically reverts to the accessory lighting mode and emits light in the color of the removable color chip if the accessory switch is activated and is coupled to power 218. If not, the lighting system 100 is turned off. The lighting system 100 automatically provides additional D.O.T. acceptable lighting while driving or otherwise operating the vehicle.

Figure 6:
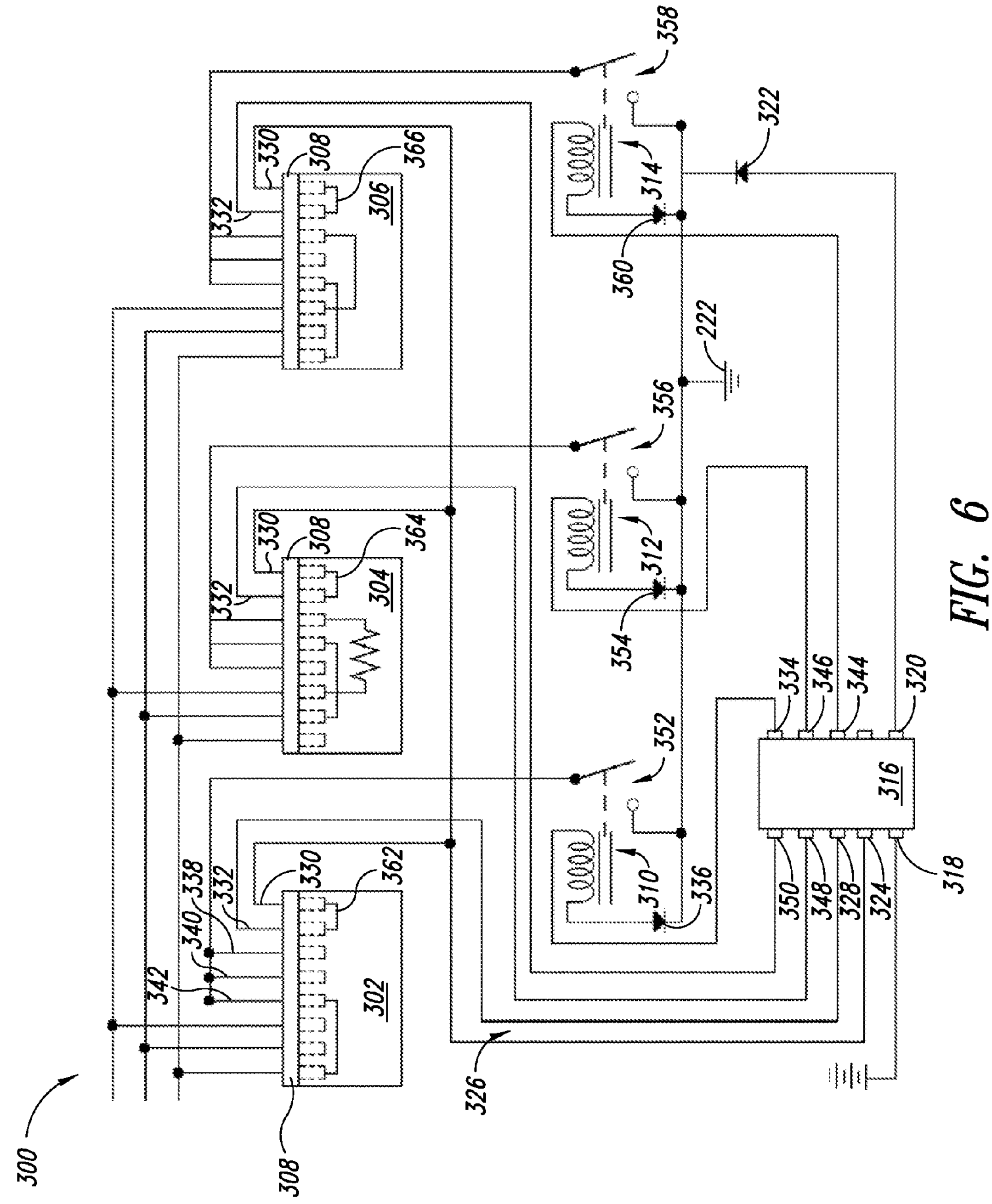
FIG. 6 is a circuit schematic of an alternative embodiment of the color switching device of FIG. 5.

FIG. 6 illustrates an embodiment of additional circuitry 300 that may be coupled to the color switching device 200 of FIG. 5. The additional circuitry 300 is configured to interface with a plurality of removable color chips 302, 304, 306, instead of the single color mapping interface 214 of FIG. 5. The color switching device 200 may be manufactured to have any number of color mapping interfaces 214, 308. In this embodiment, the color mapping interfaces 308 are configured to have eight positions that receive color signals from eight-position removable color chips 302, 304, 306.

In FIG. 6, three relays 310, 312, and 314 are each coupled to one of the color mapping interfaces 308. The additional circuitry 300 also includes an embedded microcontroller (EMC) 316 that is configured to cycle the light emitted from the lighting system 100 between the colors associated with the plurality of removable color chips 302, 304, 306.

The EMC 316 configured to couple to the color switching device 200 has a power input pin 318 that is coupled to the first input 232 of the four-position connector 224. As described above, the first input 232 is coupled to the accessory switch 212 and the ignition switch 202. A ground pin 320 is connected to a diode 322 to prevent reverse current flow, and then to the common ground 222. A color chip power pin 324 is coupled to a shared bus wire 326 that is coupled to each of the color mapping interfaces 308. The shared buss wire 326 is configured to electrically connect to a first auto-sensing contact 330 on the color mapping interfaces 308 that communicate with the color chips 302, 304, 306.

A first color chip pin 328 on the EMC 316 is connected to a second contact 332 on the color mapping interface 308 associated with the first color chip 302. A first relay pin 334 on the EMC 316 is connected to a coil of the first relay 310. Another contact of the relay 310 is connected to a diode 336 to prevent reverse current flow and then to the common ground 222. A third, fourth, and fifth contact 338, 340, and 342, respectively, are connected to a first switch 352 associated with the first relay 310.

Similarly, a second color chip pin 348 on the EMC 316 is connected to a second contact 332 on the color mapping interface 308 associated with the second color chip 304. A second relay pin 346 on the EMC 316 is connected to a coil of the second relay 312. Another contact of the relay 312 is connected to a diode 354 to prevent reverse current flow and then to the common ground 222. A third, fourth, and fifth contact 338, 340, and 342, respectively, of the color mapping interface 308 associated with the second color chip 304 are connected to a second switch 356 associated with the second relay 312.

The EMC 316 also includes a third color chip pin 350 that couples to the second contact 332 and a third relay pin 344 that couples to the third relay 314. As with the other color mapping interfaces 308 and relays 310, 312, a third switch 358 couples the third, fourth, and fifth contacts 338, 340, and 342, to ground 222 when closed.

The relays 310, 312, and 314 are illustrated as single pole single throw type switches, however other types of switching devices may be utilized. For example, a power metal oxide semiconductor field effect transistor (MOSFET) may be used.

The EMC 316 is configured to alternatively cycle between the different color signals automatically detected from the removable color chips 302, 304, 306, causing the LEDs 114 to alternatively emit light in the different user-selected colors. The EMC 316 in the color switching device 200 determines which color mapping interfaces 308 have removable color chips 302, 304, 306 inserted into the color switching device 200 by determining which of the color mapping interfaces 308 have a non-zero voltage.

This is accomplished with sensing circuits that may be associated with the first contact or input 330 of the color mapping interface 308. Each sensing circuit of each color mapping interface 308 is connected to the first color chip pin 328, the second color chip pin 348, and the third color chip pin 350, respectively. When power is supplied to the EMC 316, power is supplied to the sensing circuit shared power bus 326. Jumpers 362, 364, 366 in removable color chips 302, 304, 306, respectively, complete the sensing circuit and allow current to flow to the respective color chip pins 328, 348, 350 on the EMC 316.

When the color chip pins are in a non-zero voltage state, the respective color mapping interface 308 is considered active. A program embedded in the EMC 316 polls the color chip pins 328, 348, 350 to determine the active pins, thereby determining both the number and location of the removable color chips 302, 304, 306.

If the vehicle is in operation and the ignition switch 202 is energized, then the color switching device 200 bypasses the color mapping interfaces 308 and provides current to the LEDs 114 in the lighting system 100 in a ratio to emit light in a D.O.T. approved color. Alternatively, if the ignition of the vehicle is off and the accessory switch 212 is closed, the color switching device 200 provides power in a steady on state to the respective red, green, and blue LEDs in the ratio predetermined by the removable color chips until the color switching device 200 is turned off or the ignition switch 202 is activated.

The EMC 316 in the color switching device 200 executes a looping program that first counts the number of active removable color chips 302, 304, 306. If only one removable color chip 302 is present, the flow of electricity passes through the removable color chip 302 the entire time the color switching device has accessory power and the ignition switch is off. If more than one removable color chip 302, 304, 306 is present a looping program directs the flow of electricity through the first removable color chip 302 to provide the ratio of power to the respective red, green, and blue LEDs 114 controlled by the first removable color chip 302. A cycle timer function in the embedded program then waits a period of time that was either pre-selected by the user or fixed within the program. Once the period of time has elapsed, the program then redirects the flow of electricity from the first removable color chip 302 to the second removable color chip 304 in the color switching device 200.

The transition between colors can be a gradual dimming of one color, followed by a gradual brightening of the next color through the use of MOSFETs as high speed switching devices, rather than relays. This is combined with using the EMC 316 to pulse-width modulate (PWM) the power to the LEDs. The design of alternative circuits using pulse width modulation or other control mechanisms are well known in the art and will not be described in detail.

Subsequently, the cycle timer function then restarts the timing cycle. Upon completion of the second timing cycle the program checks the third color mapping interface 308 to see if a removable color chip 306 is present. If the third removable color chip 306 is not present in the color switching device then the program goes back to the beginning of the programming loop, switches the flow of electricity so that it is once again passing through the first removable color chip 302, and restarts the cycle that switches between the two color mapping modules 302 and 304. This is repeated until the color switching device is powered off, or until the color switching device senses the ignition switch 202 has been turned on.

If a third removable color chip 306 is present in the color switching device 200, i.e., three sensing circuits are active, the program then redirects the flow of electricity from the second removable color chip 304 to the third removable color chip 306. The cycle timer function then restarts the timing cycle. Upon completion of the third timing cycle the program goes back to the beginning of the programming loop and switches the flow of electricity so that it is once again passing through the first removable color chip 302. Then the loop restarts and cycles between the three removable color chips. This is repeated until the color switching device 200 is powered off or until the ignition switch 202 has been turned on.

This ability allows motorists to select the colors they want to be in the cycle, while still maintaining the capability of the color switching device to automatically change the color of the lights to the correct color for driving. For example, if a motorist wanted the LEDs to cycle between emitting the colors of red, then white, then blue, the motorist would insert a red, a white, and a blue removable color chip into the color switching device. If they later wanted to have the lights cycle between the colors purple and orange, they would remove the red, white, and blue removable color chip from the color switching device and insert a purple and an orange removable color chip.

When the color switching device 200 of FIGS. 5 and 6 allows current to flow through the LEDs 114, the lighting system 100 emits light in the colors of the removable color chips or the D.O.T. specified color as directed by the color switching device. The emitted light is directed toward the peak 142 of the housing 102. The majority of the light in the portion of the view angle closest to the light-diffusing lens 118 strikes the stipples or prisms on the incident side of the light-diffusing lens 118 directly. Since the reflector 116 does not block this portion of the LED view angle, the light strikes the entire viewable area of the diffusing lens from multiple directions.

The color switching device controls numerous multicolor LEDs and color chips simultaneously, thereby allowing multiple sets of lights installed on a vehicle to change the set of colors emitted rapidly, by unplugging the removable color chip and installing a color chip of a different color. It also provides a much higher degree of consistency of color hue across multiple vehicles without the need for a visual reference vehicle as the ratio of electrical current to the red, green, and blue LEDs is hard-wired into the circuit paths. This eliminates variations in the ratios introduced by the user. Additionally, since the difference between hues is set by substituting a different value resistor when manufacturing the color mapping modules, small runs of a broad range of hues are more economically viable versus the minimum production run size of fixed color LEDs in a non-stock hue. This allows even a small fleet of vehicles to have lights in a custom matched color.

Figure 7:
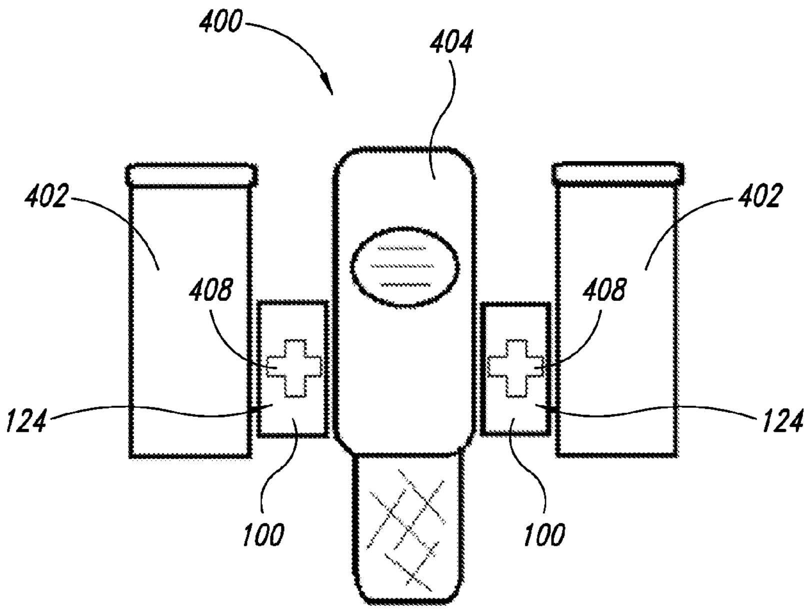
FIG. 7 is an embodiment of the lighting system on the rear of a motorcycle placed in a vehicle cavity between a rear fender and a saddlebag.
Figure 8:
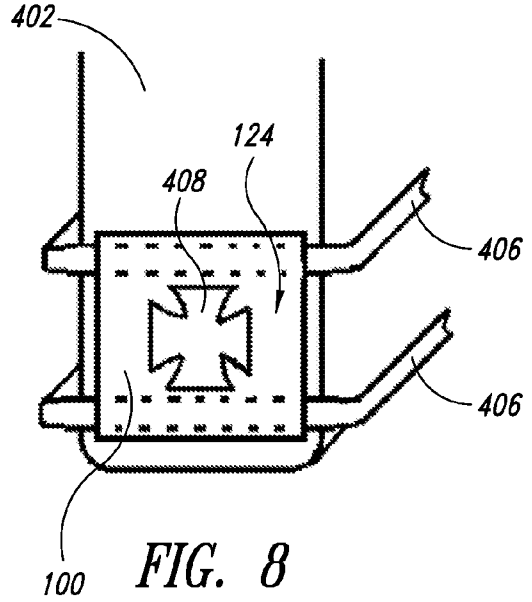
FIG. 8 illustrates an embodiment of the lighting system mounted on guard rails of a motorcycle.

FIG. 7 is a rear facing embodiment of the lighting system 100, which is affixed to the rear of a motorcycle 400 between a saddlebag 402 and the rear fender 404. FIG. 8 is an embodiment of the lighting system 100 positioned on saddlebag 402 guard rails 406 for the motorcycle 400. In addition, FIG. 9 is another embodiment of the lighting system 100 attached to the saddlebag 402.

When the motorcycle 400 is parked with the ignition switch 202 in the off position the light system 100 may be used for decorative purposes by supplying power from the accessory switch 212 on the vehicle. In this mode the light illuminates a design or pattern of light in a color or colors selected by the user, via the lens 118, through a shaped opening 408 in an interchangeable metal faceplate 124. Exemplary patterns are flames, a Maltese cross, stars, words, or any other user-selected pattern.

Figure 9:
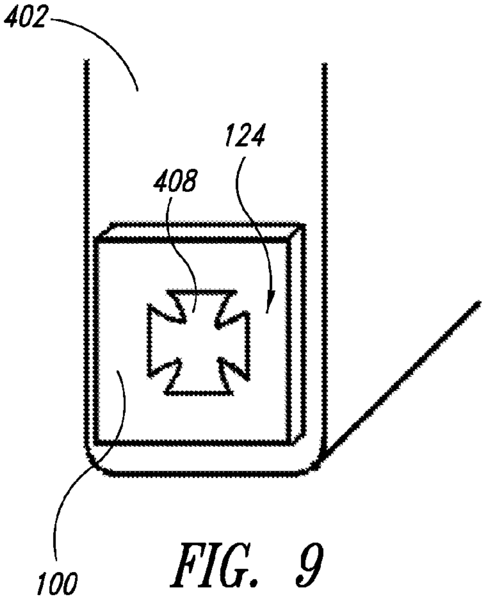
FIG. 9 illustrates an embodiment of the lighting system mounted to a surface of a saddlebag.

In FIGS. 7, 8, and 9, when the ignition switch 202 is changed to the on position the lighting system automatically changes to the operation mode and illuminates the pattern in the color red so as to function as additional taillights. The lighting system 100 thereby provides additional visibility of the motorcycle 400 to other motorists.

Figure 10:
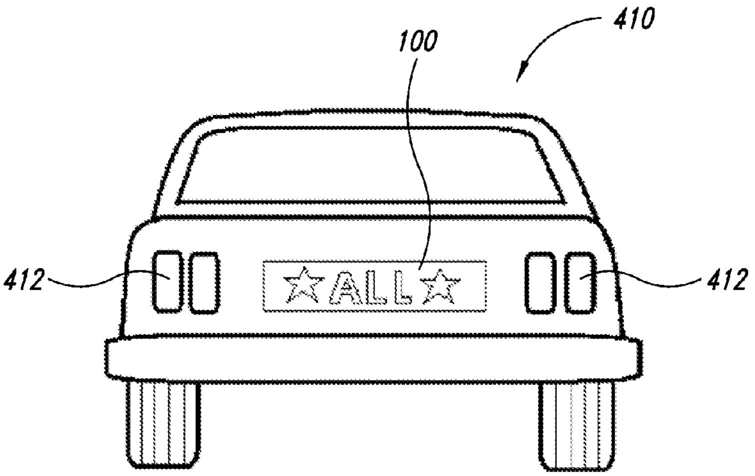
FIG. 10 illustrates an embodiment of the lighting system mounted directly to a body panel at the rear of a motor vehicle.
Figure 11:
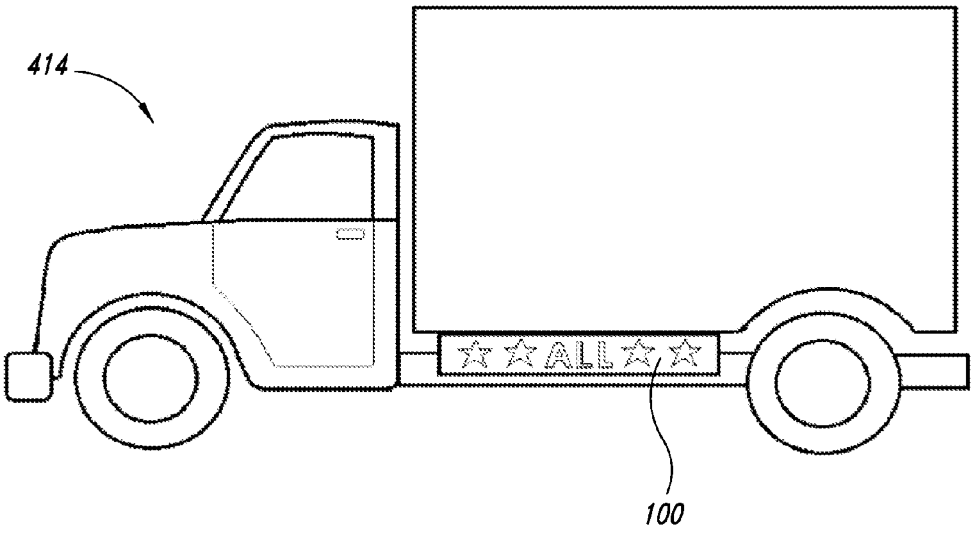
FIG. 11 illustrates an embodiment of the lighting system mounted to a side of a vehicle.

An alternative embodiment of the lighting system is provided in FIG. 10, which illustrates a lighting system 100 placed on the rear of a vehicle 410 positioned between taillights 412. In addition, FIG. 11 illustrates the lighting system 100 on a side of a truck 414 positioned to be visible by motorists and pedestrians. In FIGS. 10 and 11, the lighting system may be an advertisement for a company with the name "All Star" formed from a pattern through the faceplate spelling "ALL" and having star shaped openings.

As mentioned above, the lighting system may be used for advertising, promoting a product, displaying a company name, an event, a website, a phone number, or any other desired pattern. The company may select a color or colors that match the company logo or correspond to a particular product that is being promoted. In addition, a company may change the faceplates to promote other products or advertise for new features. Alternatively or additionally, the faceplate may be configured to provide support for the user's favorite team or school. For example, the user may want to display a school's mascot in the school's colors while tailgating. In this use, the team colors will be displayed and the pattern will be a name, slogan, and/or symbol of the school or team.

For the arrangement in FIG. 11, the lighting system 100 is configured to emit amber light associated with the D.O.T.

requirements for lights on the side of a vehicle when the ignition switch 202 is activated. Accordingly, the lighting system continues to illuminate the advertising message in a D.O.T. specified color rather than the user-specified color.

Figure 12:
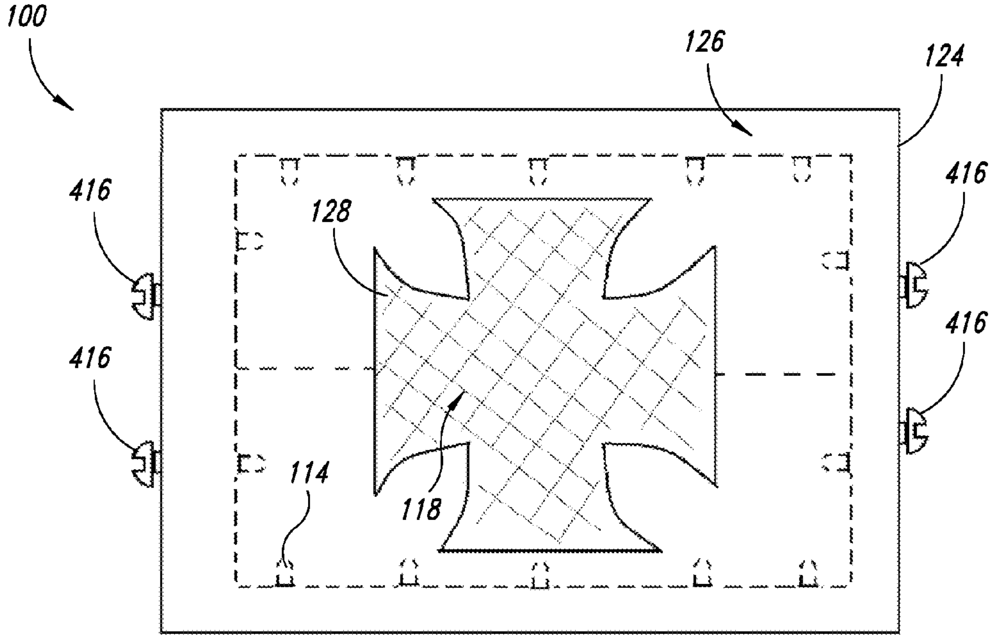
FIG. 12 is a front view of a faceplate and a prismatic lens according to an embodiment of the present disclosure.

FIG. 12 is a front view of the lighting system 100 according to an embodiment of the present disclosure. The transparent region 128 of the faceplate 124 is formed in the shape of a Maltese cross that allows the lens 118 to be viewed from the front of the lighting system 100. The transparent region 128 may be formed as an opening with no material protecting the lens 118. Alternatively, the transparent region 128 may be a material that protects the lens 118 from dirt or other debris, but does not obscure the emitted light. The opaque region 126 of the faceplate 124 conceals the perimeter-mounted LEDs 114 from view from the front of the lighting system. Fasteners 416 are configured to attach the faceplate 124 to the housing.

Advantageously, the arrangement of the LEDs 114 transverse to the side panels of the housing allow for a reduction in the number of LEDs used to illuminate the same surface area. For example, the Maltese cross of FIG. 1 uses an array of 24 LEDs to illuminate the cross for in line-of-sight viewing. The same size and shape pattern illustrated in FIG. 12 uses 14 LEDs positioned adjacent the side panels.

Figure 1:
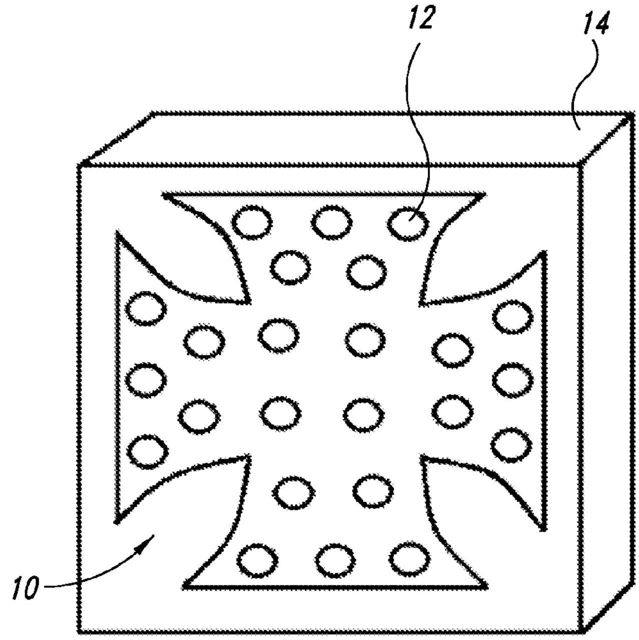
FIG. 1 (Prior Art)
FIG. 1 illustrates a known array of fixed LEDs arranged in a pattern or design.

The actual number of LEDs 114 used will vary by design or pattern, but an average pattern or design illuminated by the lighting system of the present disclosure will use 40 to 60 percent fewer LEDs to illuminate the same pattern or design than a fixed array of LEDs as in FIG. 1. This significant reduction in energy consumption is critical for the vehicle if parked with the display or accessory lights on when the battery is not charging. In addition, this greatly extends parked display time.

FIG. 13 illustrates the lighting system 100 of FIG. 12 without the faceplate 124 or lens 118. The housing 102 includes the back panel 104 formed transverse to side panels 108 and 110. Other side panels 420 and 422, not previously presented, are included to form the rectangular housing 102. The LEDs 114 are formed on each of the side panels 108, 110, 420, and 422 spaced from the panels by the perimeter edge 134. The reflector 116 is positioned so that the peak 142 is aligned with a central axis of the housing 102. A plurality of threaded brass or stainless steel mounting inserts 418 are formed in the side panels 420 and 422 to receive the fasteners 416 described in FIG. 12. The inserts 418 are configured to attach the faceplate 124 to the housing 102. The faceplate 124 may be attached to the housing 102 with other securing devices such as a bezel that may also provide an attachment point for a mounting bracket to attach the housing directly to the vehicle.

Figure 14:
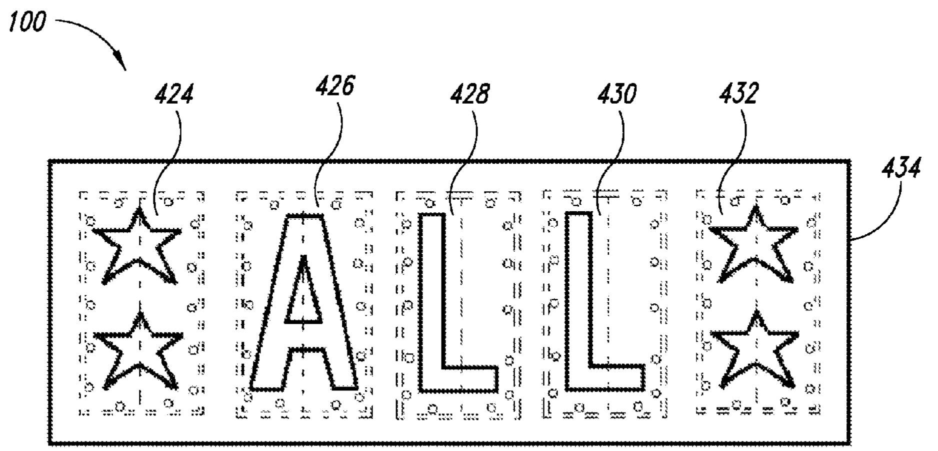
FIG. 14 is an embodiment of the present disclosure that includes multiple housings and a single faceplate.

An alternative embodiment of the lighting system 100 is illustrated in FIG. 14 having five housings 424-432 and a single faceplate 434. The faceplate 434 includes two stars aligned overlying the first housing 424, an "A" pattern overlying the second housing 426, two "L" patterns overlying the third and fourth housings 428 and 430, and another two stars overlying the fifth housing 432. The multiple housings provide additional flexibility to emit multiple colors by using separate color switching devices 200 and removable color chips for each housing.

Figure 15:
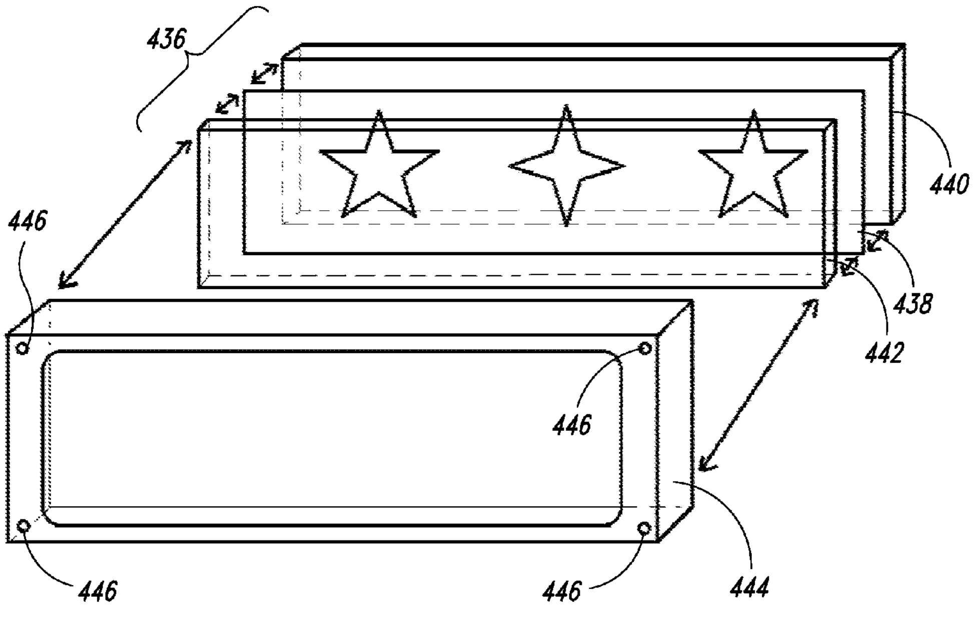
FIG. 15 is an embodiment of the lighting system having a faceplate and a thin light mask sandwiched between two clear plastic panels.

FIG. 15 is another embodiment of the lighting system having an interchangeable faceplate 436 that may include a light mask 438 that does not initially have a design or pattern formed thereon. The light mask 438 may be an opaque material such as vinyl or Mylar™ that is bonded to a clear plastic back panel 440. A protective clear polycarbonate front panel 442 may be included prevent dirt and debris from affecting the light mask 438. A separate removable bezel 444 is sized and shaped to slide around outer edges of the interchangeable faceplate 436 to hold the faceplate 436 against the vehicle light housing 102. The bezel 444 may include through-holes 446 configured to allow fasteners to attach the bezel to the interchangeable faceplate 436 and to the housing 102. The bezel 444 includes an opening 448 that allows the interchangeable faceplate 436 to be viewed.

The pattern or design may be cut from the opaque light mask 438 using any desirable methodology appropriate to the mask material, including but not limited to laser-cutting, water jet-cutting, vinyl-cutting, silk-screening, or the like. In an embodiment where the faceplate is made of injection molded plastic, the pattern or design may be incorporated into the mold.

In an alternative embodiment, the lighting system may be configured to provide brake, reverse, and turn signal capability with additional brightness. For example, the color switching device 200 may be configured to illuminate additional red LEDs coupled to the color switching device. The additional red LEDs may be spaced intermittently with respect to the RGB LEDs 114. An additional lead wire may be included to provide power to the red LEDs when the brakes or turn signals are activated. Alternatively, the EMC may be configured to change the multicolor LEDs in the light housing to display the color of light associated with the particular function, creating a multi-function taillight and backup light.

More particularly, the color switching device may have an additional input connected to a circuit which is powered when the backup light of the vehicle is activated. When the vehicle is to put in reverse an electrical current is provided to the backup light power input of the color switching device. The color switching device can switch the electrical current flow from the removable color chips to a separate circuit causing the RGB LEDs in the rear facing vehicle light to emit white light so as to function as a backup light.

The lighting system of the present disclosure provides the user with the ability to change the design or pattern and color of light emitted without changing the housing 102. The faceplate, which dictates the shape of the pattern of light emitted, is easily changed to accommodate the desires of the user. Changing the faceplate is accomplished by removing the fasteners that affix the faceplate to the housing or by removing the bezel holding the faceplate to the housing.

In addition, the thin housing is easily attached to various surfaces of vehicles. The housing may be mounted directly to a body panel, mounted in a cavity of the vehicle, mounted to the vehicle with brackets, or by any other suitable method of attachment. In addition, a user may desire to attach the lighting system to an interior of the vehicle, positioned so that the lighting device can be viewed through a window.

The combination of aspects of the disclosure allow the ability to mix and match components of the system thereby creating a large number of possible combinations, which provides the motorist with a high degree of customization. The mix and match benefit for dealers is the ability to provide a large number of configurations without a large amount of inventory.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A lighting system for vehicles, comprising:

a housing having a front panel and a back panel, the front panel having an opening;

a reflector in the housing positioned adjacent the back panel;

a plurality of light sources in the housing positioned on sides of the housing that are transverse to the back panel;

a lens positioned in the housing between the plurality of light sources and the front panel;

a plurality of fasteners configured to couple the lens to the housing;

a faceplate configured to couple to the housing adjacent the front panel, the faceplate having a transparent pattern;

a controller coupled to the light sources having a first input configured to couple to a vehicle ignition switch and a second input configured to couple to an accessory switch; and a color mapping interface coupled to the controller and configured to receive at least one removable color chip, the controller configured to detect at least one color signal from the at least one removable color chip and to control the plurality of light sources in response to the at least one detected color signal.

2. The lighting system of claim 1 wherein the controller includes an embedded microcontroller configured to cycle the plurality of light sources between colors that correspond to detected color signals from the at least one removable color chip.

3. The lighting system of claim 1 wherein the reflector has a first end and a second end that are adjacent the back panel and a peak along a central axis of the reflector that is spaced from the back panel by a first distance.

4. The lighting system of claim 3, further comprising a mounting system that comprises:

a malleable member positioned between edges formed on the sides of the housing and ends of the lens;

the plurality of fasters configured to bring the lens into contact with the malleable member to form a cavity that encloses the light sources and the reflector; and a light source mount positioned adjacent the fastener and configured to position the plurality of light sources at a second distance from the back panel, wherein the second distance is greater than the first distance.

5. The lighting system of claim 4 wherein the light sources are mounted to the sides of the housing between the malleable member and the back panel.

6. The lighting system of claim 1 wherein the light sources are light emitting diodes that are configured to emit a plurality of colors.

7. The lighting system of claim 1 wherein the reflector has a shallow inverted V shape, a peak of the V extending along a central axis of a length of the housing and a slope of sides of the V increasing in steepness as the sides approach the peak.

8. The lighting system of claim 1 wherein the faceplate has an opaque region and the transparent pattern, wherein the opaque region covers a portion of the housing where the light sources are mounted.

9. The lighting system of claim 1 wherein the transparent pattern is configured to be uniformly backlit by the plurality of light sources.

10. An apparatus, comprising:

a vehicle;

a lighting system coupled to the vehicle, the lighting system comprising:

a housing coupled to the vehicle, the housing having a front panel and a back panel, the front panel having an opening;

a reflector in the housing positioned adjacent the back panel;

a plurality of light sources in the housing positioned on sides of the housing that are transverse to the back panel;

a lens positioned in the housing between the plurality of light sources and the front panel;

a plurality of fasteners configured to couple the lens to the housing;

a faceplate configured to couple to the housing adjacent the front panel, the faceplate having a pattern;

a controller coupled to the light sources having a first input coupled to a vehicle ignition switch and a second input coupled to an accessory switch; and a color mapping interface coupled to the controller and configured to receive at least one removable color chip, the controller configured to detect at least one color signal from the at least one removable color chip and to control the plurality of light sources in response to the at least one detected color signal.

11. The apparatus of claim 10 wherein the controller includes an embedded microcontroller configured to cycle the plurality of light sources between colors that correspond to detected color signals from the at least one removable color chip.

12. The apparatus of claim 10 wherein the reflector has a first end and a second end that are adjacent the back panel and a peak along a central axis of the reflector that is spaced from the back panel by a first distance.

13. The apparatus of claim 12, further comprising a mounting system that comprises:

a malleable member positioned between edges formed on the sides of the housing and ends of the lens;

the plurality of fasters configured to bring the lens into contact with the malleable member to form a cavity that encloses the plurality of light sources and the reflector; and a light source mount positioned adjacent the plurality of fasteners and configured to position the plurality of light sources at a second distance from the back panel, wherein the second distance is greater than the first distance.

14. The apparatus of claim 10 wherein the light sources are light emitting diodes that are configured to emit a plurality of colors.

15. A lighting system for a vehicle, comprising:

a housing having a back panel, a front panel that has an opening, and first and second side panels that are transverse to the front and back panels;

a light guide positioned in the housing having a first section and a second section that cooperate to form a central ridge that is spaced from the back panel by a first distance, the first and second sections having a curvature from the central ridge towards an intersection of the back panel and first and second side panels, respectively;

a plurality of light sources mounted to the first and the second side panels and positioned transverse to the back panel;

a lens coupled to the housing between the light sources and the front panel;

a faceplate coupled to the front panel of the housing, the faceplate having an opaque section and a transparent section having a shape; and a mounting system, comprising:

a malleable member positioned between edges formed on the first and second side panels and ends of the lens;

a plurality of fasteners that couple the lens to the housing and are configured to bring the lens into contact with the malleable member to form a cavity that encloses the plurality light sources and the reflector; and a light source mount positioned adjacent the plurality of fasteners and configured to position the plurality of light sources at a second distance from the back panel, wherein the second distance is greater than the first distance of the central ridge.

16. The lighting system of claim 15, further comprising:

a controller coupled to the plurality light sources having a first input coupled to a vehicle ignition switch and a second input coupled to an accessory switch;

a color mapping interface coupled to the controller and configured to receive at least one removable color chip, the controller configured to detect at least one color signal from the at least one removable color chip and to control the plurality of light sources in response to the at least one detected color signal; and an embedded microcontroller configured to cycle the plurality of light sources between colors that correspond to detected color signals from the at least one removable color chip.

* * * * *